United States Patent [19]

Aymong

[11] Patent Number: 4,722,800

[45] Date of Patent: Feb. 2, 1988

[54] OIL-WATER SEPARATOR

[75] Inventor: Gregory G. Aymong, Port Jefferson Station, N.Y.

[73] Assignee: Highland Tank and Manufacturing Company, Stoystown, Pa.

[21] Appl. No.: 868,948

[22] Filed: May 30, 1986

[51] Int. Cl.⁴ .................. B01D 17/028; B01D 21/24; B03D 3/00

[52] U.S. Cl. .................................. 210/802; 210/804; 210/170; 210/320; 210/519; 210/521; 210/DIG. 5

[58] Field of Search .............. 210/804, DIG. 5, 170, 210/320, 519, 521, 522, 747, 802; 55/174

[56] References Cited

U.S. PATENT DOCUMENTS

| | | | |
|---|---|---|---|
| 11,745 | 6/1899 | Friedrich | 137/590 |
| 1,702,612 | 2/1929 | Morse. | |
| 1,702,613 | 2/1929 | Morse. | |
| 1,775,233 | 9/1930 | Brakensiek. | |
| 1,804,743 | 5/1931 | Cannon. | |
| 1,990,214 | 2/1935 | Zapffe. | |
| 2,140,582 | 12/1938 | Hirshstein. | |
| 2,207,399 | 7/1940 | Gaertner. | |
| 3,147,221 | 9/1964 | Johnston | 210/519 |
| 3,182,799 | 5/1965 | Krofta. | |
| 3,212,758 | 10/1965 | Ranson. | |
| 3,346,122 | 10/1967 | Cornelisson. | |
| 3,399,135 | 8/1968 | Conley, Jr. et al. | 210/521 |
| 3,529,728 | 9/1970 | Middlebeek et al. | 210/522 |
| 3,804,252 | 4/1974 | Rishel | 210/532 |
| 3,849,311 | 11/1974 | Jakubek | 210/532 |
| 3,923,659 | 12/1975 | Ullrich | 210/521 |
| 3,953,332 | 4/1976 | Speth et al. | 210/521 |
| 3,957,656 | 5/1976 | Castelli | 210/521 |
| 4,042,512 | 8/1977 | McCarthy et al. | 210/521 |
| 4,111,805 | 9/1978 | Van Pool et al. | 210/522 |
| 4,120,797 | 10/1978 | Huebner | 210/522 |
| 4,132,651 | 1/1979 | de Jong | 210/522 |
| 4,203,849 | 5/1980 | Ino et al. | 210/522 |
| 4,422,931 | 12/1983 | Wolde-Michael | 210/168 |

FOREIGN PATENT DOCUMENTS 55-6402 2/1980 Japan.
1074562 2/1984 U.S.S.R..

Primary Examiner—Ernest G. Therkorn
Assistant Examiner—Richard D. Jordan
Attorney, Agent, or Firm—Buell, Ziesenheim, Beck & Alstadt

[57] ABSTRACT

Oil-water separation apparatus and method employing a velocity head diffusion baffle facing upwardly and towards the feed end of a separator tank to which feed flow is directed. The separator tank comprises a relatively turbulent inlet section and a relatively large separator section and the baffle tends to isolate inlet turbulence from the separator section. Furthermore, the baffle tends to reduce flow turbulence in the separator section and to distribute flow of the inlet stream over the entire width of the tank. The baffle tends to improve the separation of solids and any immiscible liquids which are susceptible to gravity separation.

24 Claims, 15 Drawing Figures

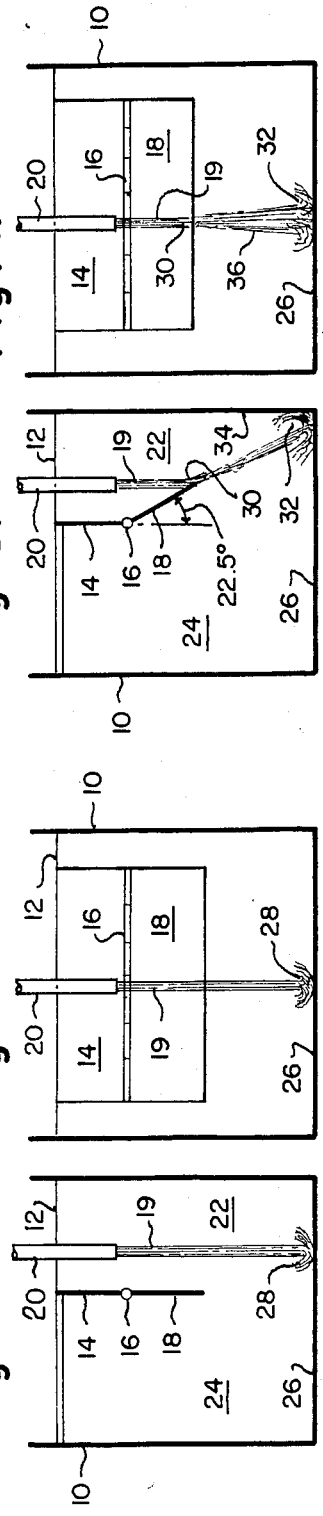

OIL-WATER SEPARATOR

This invention relates to apparatus and method for the separation of a mixture containing immiscible liquids and possibly solids. The invention is primarily applied to the treatment of waste water containing materials including oil, grease and sand.

This invention can be applied to the separation of immiscible liquids of differing specific gravities and which are therefore susceptible to gravity separation. It is also related to the separation of solids from such mixtures. The apparatus for performing the invention is generally installed underground and is adapted for handling oil-water run offs from rain or hosedowns at gasoline service stations, truck stops, parking lots, shopping mall areas, roadways, bus garages, petroleum plants, terminals and marketing facilities.

According to the method of the invention, a mixture comprising water, oil and solids is introduced to a separator tank full of water. The tank is divided into two successive chambers including a relatively small inlet chamber and a relatively large separator chamber. An inlet nozzle directs the mixture downwardly onto a velocity head diffusion baffle. The baffle is disposed in the inlet chamber and its face, which comprises a flat surface, is inclined upwardly so that it faces towards the inlet nozzle and towards the inlet end of the tank. The baffle is disposed to reduce and isolate inlet turbulence and to relatively evenly distribute the flow over the entire width of the tank. The flat surface of the baffle contributes to reduction of turbulence.

Because the diffusion baffle faces upwardly and towards the inlet end of the tank, it deflects the incoming flow downwardly and outwardly from itself towards the inlet end wall of the tank to create a serpentine flow pattern. Any useful angle of inclination can be employed depending on the distance between the baffle and the inlet end of the tank and the dimensions of the tank. However, bests results are obtained when the diffusion baffle is disposed at an angle of 35 to 55 degrees, preferably about 40 to 50 degrees and most preferably about 45 degrees with respect to the horizontal. The flow pattern can deflect the incoming stream to flow across the entire inlet end of the tank. Deflection of the incoming stream to the inlet end of the tank increases utilization of tank volume and increases retention time. It is an important feature of the diffusion baffle that it tends to block off a relatively small turbulent inlet region in the tank from a relatively large more quiescent separation region. In addition, it causes the maximum turbulence area to face away from the separation region. Turbulence is adverse to separation because it converts large globules of oil into small globules, which are more easily dispersed into water.

A pack of corrugated coalescer plates is disposed within the separator region. The coalescer plates operate cooperatively with respect to the diffusion baffle. The coalescer plates function best with laminar flow rather than turbulent flow, because turbulence constitutes a mixing effect. The diffusion baffle contributes to laminar flow at the coalescer plates by causing the turbulent zone to face away from the coalescer baffles.

The serpentine flow pattern within the separator as illustrated below shows that the angle of inclination of the diffusion baffle and of the coalescer plates contribute to their cooperative operation. The corrugations on the coalescer plates extend transversely to the longitudinal axis of the separator tank, which is also transverse to the flow path. The corrugated plates direct flow upwardly and towards the outlet end of the tank to induce coalescence. Any suitable angle of inclination of the corrugated plates can be employed. However, the angle of inclination of the corrugated plates is generally about 10 to 60 degrees, preferably 15 to 45 degrees, and most preferably about 22.5 degrees. Oil globules rise the short distance between adjacent plates to coalesce on the undersides of the plates and creep up the plate surface to the outlet region of the tank. Coalescence occurs when large oil droplets rising at a high rate of speed collide with smaller, slower droplets. The larger droplets which are formed combine again with small droplets to form even larger droplets with an even higher rate of rise. Solid particles sink and agglomerate on the top of the plates and slide down the surface of the plates to the inlet section of the plates.

In the separator section, the oil and water form separate layers because of the difference in specific gravity. A sensor can detect the level of the oil layer and activate a pump for the removal of oil from the oil layer. Purified water, preferably having an oil content of less than 15 ppm, is separately removed from the tank by gravity displacement, i.e. the incoming stream displaces the water layer which is formed. For optimum performance, the water level in the separator is maintained above the position of the diffusion baffle.

The diffusion baffle tends to isolate inlet turbulence from the separation section of the tank. The diffusion baffle can be mounted on a barrier member which extends transversely cross the top hemisphere of a cylindrical oil-water separator tank. The barrier member further contributes to the segregation of a turbulent inlet section from a more quiescent separator section.

The diffusion baffle arrangement of this invention is contrasted to the baffle arrangement taught in U.S. Pat. No. 4,042,512 to McCarthy et al. In that patent a baffle is inclined in a direction to direct an inflowing stream of an oil-water separator directly towards a pack of coalescer baffles. The baffle of the McCarthy patent disadvantageously demarks a space between itself and the inlet end wall that is not used for separation, thereby reducing the effective capacity of the tank. In addition, the McCarthy et al. baffle is corrugated, which contributes turbulence, whereas the diffusion baffle of this invention has a flat surface which contributes to laminar flow.

In the separator of this invention, a sludge transverse baffle is provided at the bottom of the pack of corrugated coalescer plates. The baffle restricts oily contaminated solid particles or heavy matter at the inlet of the coalescer plates and prevents them from reaching the purified water phase. In addition, by-pass prevention barrier means are disposed between each side of the pack of corrugated plates and the separator tank. The sludge baffle and the by-pass prevention barrier means prevent any short-circuiting of flow around the pack and forces all liquid to flow through the pack of coalescer plates. A small area at the extreme top of the plate pack can open to distribute and equalize the accumulating oil phase over the entire surface of the separator except for the turbulent inlet zone.

The purpose of the pack of corrugated coalescer plates is (1) shorten the distance an oil globule or solid particle has to rise or sink, respectively, for effective separation; (2) enhance coalescence by causing the smaller globules and particles (those possessing smaller rising/settling rates) to coalesce on the plates thereby agglomerating and forming larger globules and particles; (3) direct the flow paths of the separated globules and particles.

Under the influence of the diffusion baffle, the waste water stream approaches the pack of coalescer plates under laminar flow conditions and enters the corrugated plate pack. The total flow is divided in the pack into vertically separate flow paths, each having a vertical rise of, for example, about 3 inches. Within the pack, each oil globule or solid particle will, in accordance with Stokes law, rise or settle at a rate depending on its own diameter. Oil globules rise and impact upon the underside of each of the plates while solid particles settle and impact on the top of each of the plates. The oil globules are coalesced into rising sheets of oil on the underside surfaces of the plates while the solid particles form a descending sludge on the top of the plates.

As the separated globules and particles migrate along the corrugated plates, agglomeration takes place due to the collision between droplets exhibiting different migration rates and solids exhibiting different solids transport rates. This agglomeration takes place in the direction of migration. The separated oil creeps up the underside surface of each of the plates and finally breaks loose at the top in the form of large globules that rapidly rise through the separating section to an overhead oil layer. The separated sediment slides down the top surface of each of the plates and drops off at the bottom to accumulate at the sludge baffle. Coalescence is important to the rate of separation (rising or settling) because the rate of separation is directly proportional to the square of particle diameter. The efficiency of separation is increased by encouraging coalescence to form increasingly large particles.

Downstream from the pack, the separated oil accumulates on the top of the tank while clarified water separately flows away from the corrugated plate pack and enters the bottom of the tank. This quiescent zone enables further gravitational separation of oil from water.

A water removal pipe is disposed close to the outlet all of the tank and is open to the lower water phase. The outlet of the water removed pipe can be open and below the operating surface of the separator to provide positive drainage of the system. The water removal pipe inlet opening is preferably located at the furthest diagonal point distant from the tank inlet nozzle. This feature provides maximum separation capacity for the tank. As an oil phase accumulates, it will displace an equal volume of water. As the oil-water interface descends, its horizontal surface area in a cylindrical tank increases to enhance globule coalescence.

The water phase effluent from the separator preferably has an oil content no higher than 15 ppm. The oil content in the clarified water phase should be sufficiently low that the oil cannot form a film or sheen or any discoloration or iridescence on the surface of the water.

The size of the separator tank or the throughput rate should be adjusted so that the horizontal velocity of liquid through the separator is no greater than 3 feet per minute, in order to provide adequate time for separation to occur. This horizontal velocity requirement is based upon American Petroleum Institute specifications. In the system, there is a competition between the horizontal velocity and the rate of rising oil and falling solids. This competition is expressed by Stokes law:

$$V_t = 0.0241 \frac{(SW - SO)}{\mu}$$

where:

$V_t$ = rate of rising of an oil globule or rate of settling of oil coated solids particle (0.015 cm. in diameter) in waste water, in feet per minute;

SW = specific gravity of waste water at temperature of flow;

SO = specific gravity of waste oil at temperature of flow; and $\mu$ = absolute viscosity of the waste water at the temperature of flow, in poises.

The invention will be more fully understood by reference to the attached drawings in which:

FIGS. 1 and 2 illustrate the effect upon flow pattern of employing a velocity head diffusion baffle with no angle of inclination;

FIGS. 3 and 4 illustrate the effect upon flow pattern of employing a velocity head diffusion baffle having a 22.5 degree angle of inclination;

FIGS. 5 and 6 illustrate the effect upon flow pattern of employing a velocity head diffusion baffle having a 45 degree angle of inclination;

FIGS. 7 and 8 illustrate the effect upon flow pattern of employing a velocity head diffusion baffle having a 67.5 degree angle of inclination;

FIGS. 9 and 10 illustrate the effect upon flow pattern of employing a velocity head diffusion baffle having a 90 degree angle of inclination;

FIGS. 11 and 12 illustrate the effect upon flow pattern of not employing a velocity head diffusion baffle;

Figure 13:
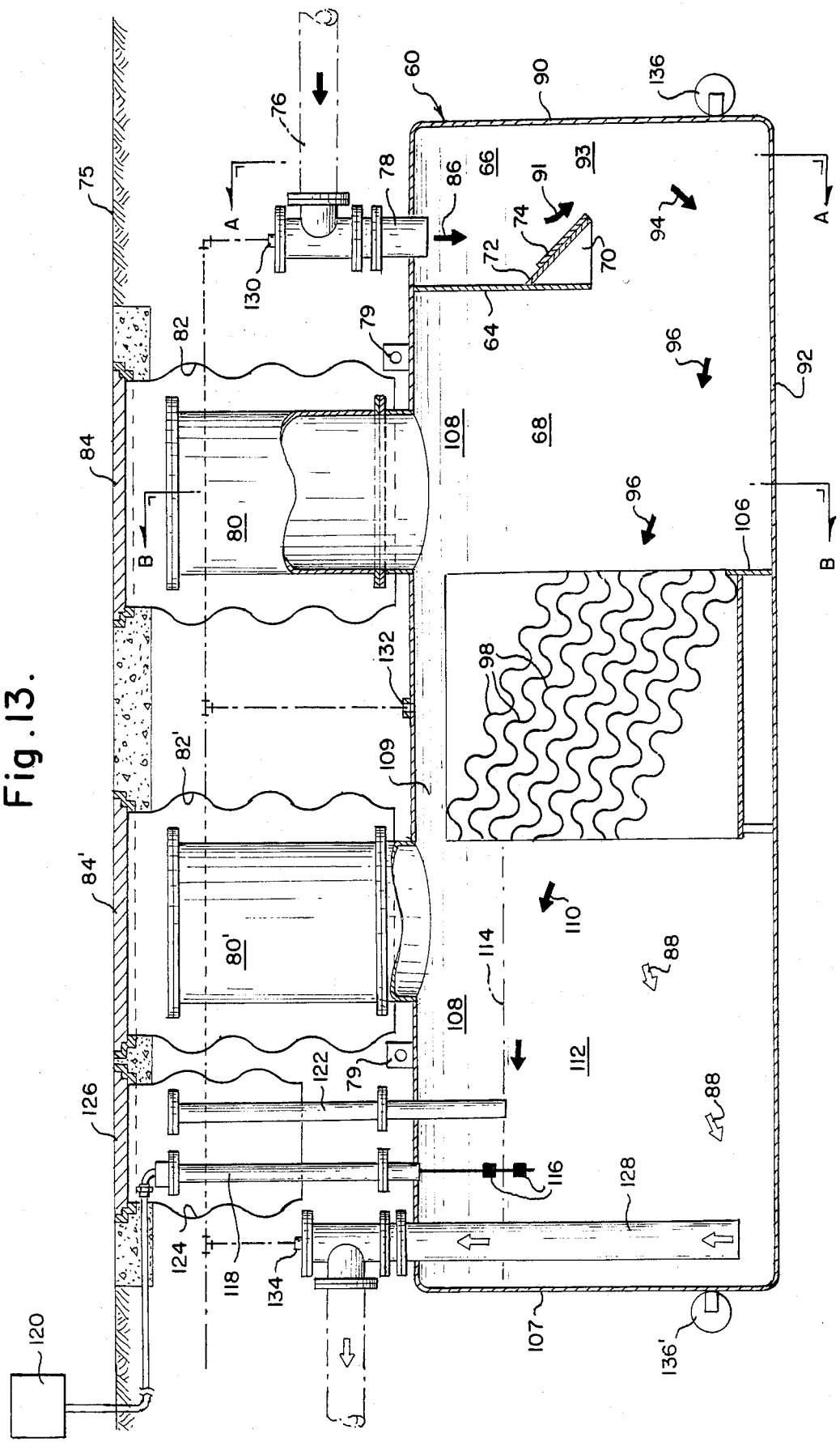
FIG. 13 is a longitudinal sectional view of an oil-water separator tank of this invention.

Tests were performed to illustrate the present invention. In the tests, the separator tank comprised a clear plastic rectangular basin. Clear acetate graph paper was attached to the outer surface of the basin to plot the fluid path. The basin was full of water at the start of each test and was generally divided into two continuous chambers by an adjustable and removable velocity head diffusion baffle. An inlet nozzle directed a fluid mixture of water and colored lamp oil from an overhead reservoir by gravity flow into the basin. In some tests, there was no deflection of flow from a baffle. In other tests, flow was deflected by a baffle disposed in the path of the fluid mixture.

In performing each test, a 2000 ml basin was first filled with clean, fresh water to an operating mark above the position of the baffle. A separate reservoir located above the level of the test basin was filled with a mixture of 800 ml of clear fresh water and 200 ml of colored lamp oil. In the various tests, the velocity head diffusion baffle was set at various angular positions, the first being vertical, or zero degrees with respect to the vertical (parallel to inlet flow).

A valve-controlled discharge port at the bottom of the overhead reservoir was disposed above the baffle of the test basin. The outlet port of the overhead reservoir constitues the inlet port for the test basin and allows colored liquid to flow gravity from the overhead reservoir to the submersed diffusion baffle in the test basin.

The flow path of the colored liquid through the colorless liquid in the test basin was observed and as plotted.

After each test, the test basin was emptied and refilled with colorless test liquid and the test was repeated except that the angular position of the baffle was changed in 22.5 degree increments. Therefore, in the various tests the angular baffle positions were vertical (parallel to inlet flow), 22.5 degrees from the vertical, 45 degrees from the vertical, 67.5 degrees from the vertical, and 90 degrees from the vertical (perpendicular to inlet form).

FIGS. 1 and 2 show a side view and a front view, respectively, of basin 10 filled with water to a level 12 and having a baffle supporting bracket 14. The bottom of bracket 14 is provided with hinge 16 for rotating velocity head diffusion baffle 18. Baffle 18 can be rotated on hinge 16 by manual rotating means, not shown, located outside of basin 10. The baffle can be held in any desired angular position during the interval of a test. A colored mixture of oil and water 19 is charged vertically downwardly by gravity flow to basin 10 through pipe 20 nozzle 20 to a relatively turbulent zone 22 thereof on one side of baffle 18 and bracket 14 reserved for the admission of the oil-water feed stream, as contrasted to a relatively quiescent zone 24 on the other side of baffle 18 and bracket 14 reserved for oil-water separation.

FIGS. 1 and 2 show baffle 18 in a vertical position (0 degrees of rotation on hinge 16) so that colored oil-water feed stream 19 enters basin 10 in a downwardly vertical direction parallel to baffle 18 and without impinging upon baffle 18. Instead, stream 19 impinges directly upon floor 26 of basin 10 as indicated at 28. The inflow impacts at floor 26 with relatively low turbulence because the water contained in basin 10 serves as a buffer to reduce the velocity of stream 19. The flow at point of impingement 28 is relatively evenly dispersed, with little or to direction imparted. There is little or no segregation of turbulence between chambers 22 and 24.

FIGS. 3 and 4 illustrate a test with baffle 18 set at an angle of 22.5 degrees with respect to the vertical. At this angular position, incoming stream 19 just impinges upon the end of baffle 18 at position 30, which causes the stream to be deflected downwardly and outwardly from baffle 18. It is noted that impingement on baffle 18 at position 30 causes the incoming stream to be somewhat laterally diffused or flared as indicated at 36 in FIG. 4. The diffusion indicated at 36 constitutes a narrow plume with very low turbulence which is deflected downwardly and outwardly from baffle 18 so that the plume impacts at floor 26 of basin 10 near inlet head 34, as indicated at 32.

In the arrangement of FIGS. 3 and 4, very low turbulence was observed. The baffle created an uneven dispersal of the flow. There was some segregation of tubulence between chambers 22 and 24.

FIGS. 5 and 6 illustrate a test with the baffle rotated to and held at a 45 degree angle with respect to the vertical. Inlet stream 19 enters basin 10 from overhead nozzle 20 under the influence of gravity and flows vertically downwardly until it impinges upon the lower portion of baffle 18 at position 38. The flow is laterally dispersed as indicated at 40 as it is deflected downwardly and outwardly towards wall 35 and a controlled and uniform plume impacts upon inlet head 34 at position 42. From position 42, flow direction is reversed as indicated at 44 while the plume continues to disperse laterally as indicated at 44 until the stream impinges on floor 26 at position 46 to cause it to assume an upward direction. There is low turbulence in the test of FIGS. 5 and 6. The plume is uniform and evenly dispersed and widens from positions 40 to 44. There is a high degree of segregation of what little turbulence is present between chambers 22 and 24.

FIGS. 7 and 8 illustrate a test with the baffle rotated and held at a 67.5 degree angle with respect to the vertical. Inlet stream 19 enters basin 10 from overhead nozzle 20 under the influence of gravity and flows vertically downwardly until it impinges upon the middle portion of baffle 18 at position 48. The flow is deflected by baffle 18 towards wall 34, where it impacts at position 50. In the tests of FIGS. 7 and 8, there is high turbulence. The flow is unevenly dispersed with random direction imparted both upwardly, downwardly and towards wall 34. There is a high degree of segregation of turbulence between chambers 22 and 24.

FIGS. 9 and 10 illustrate a test with the velocity head diffusion baffle set at 90 degrees, i.e. perpendicular to inlet flow. In this test, flow from nozzle 20 enters basin 10 and impacts upon the perpendicular surface with extremly high turbulence. The flow is evenly dispersed with little or no direction imparted. There is complete segregation of turbulence between chambers 22 and 24.

FIGS. 11 and 12 show basin 10 with the velocity head diffusion baffle removed therefrom. Flow from nozzle 20 enters the basin and is directed vertically downwardly. The flow is uninterrupted and impacts on bottom 26 of the basin with low turbulence because the water in the basin acts as a buffer to reduce the velocity of stream 19. The flow is evenly dispersed with little or no direction imparted.

The separation of immiscible liquids, such as oil and water, from each other is encouraged by maintaining the system as quiescent as possible. Turbulence should be minimized. The reason is that turbulence is a form of mixing, and mixing intersperses immiscible liquids into each other. A function of the velocity head diffusion baffle of this invention is to isolate turbulence to an inlet zone and reduce turbulence in a separation zone. Another function is to distribute the flow substantially uniformly over substantially the entire width of the oil-water separator. The above tests show that these effects are accomplished to the greatest extent in the system of FIGS. 5 and 6 wherein the slope of the diffusion baffle facing the inlet nozzle was 45 degrees with respect to the horizontal.

When the diffusion baffle angle is 45 degrees, the high velocity flow from the inlet baffle upon impacting the nozzle is immediately transformed into a diffuse cascade tapering outwardly to increase the lateral dimension of the stream with very little resulting turbulence. The resulting plume at its greatest width is subtantially equal to the width of the basin. The incoming flow is deflected by the baffle so that it impinges upon the inlet head of the basin. In this manner, the velocity head is dissipated, turbulence is reduced, and the flow is effectively and uniformly distributed over the entire width of the basin.

Another function of the velocity head diffusion baffle is to improve the rate of separation of any solids contained in the feed stream, which are susceptible to gravity separation. FIGS. 5 and 6 show that when a feed waste mixture of oil and water is directed by the inlet nozzle onto a baffle having a 45 degree slope a serpentine flow path is developed. The flow cascades downwardly and away from the baffle so that it impinges on the inlet head of the basin. The flow is further dispersed and deflected by the inlet head. At the inlet head, the flow is directed downwardly and away from the inlet head so that it impinges on the bottom of the basin. The flow is further dispersed and deflected at the bottom of the basin. Thereby, a serpentine path is developed as the waste water mixture passes in a laminar horizontal flow through the basin. The tests illustrated in the above figures show that the diffusion baffle of the present invention can deflect the incoming stream outwardly from the baffle and towards the inlet end wall so that the entire inlet volume of the basin tends to be utilized for separation. In this manner, the inclined baffle of this invention permits utilization of an enhanced portion of the separation tank by utilizing the entire inlet end of the tank for separation. In summation, the effective length of the tank for separation begins at the inlet wall so that the effective volumetric separation capacity as well as the retention time of the tank is enhanced, which in turn enhances liquid-solid and liquid-liquid separation within the tank.

FIGS. 1 through 12 show that the velocity head diffusion baffle tends to isolate inlet turbulence in the tank within an inlet zone and away from the main separator section of the tank, thereby further assisting the separation processes occurring within the tank, all of which require quiescence. The velocity head diffusion baffle extends transversely across the top hemisphere of the oil-water separator. Thereby, the turbulent inlet section is segregated from the quiescent separator section. What little turbulence exists in the inlet zone has a minimal effect upon the separation zone. The referred 45 degree angle of the sloped baffle portion particularly tends to reduce flow turbulence.

Figure 14:
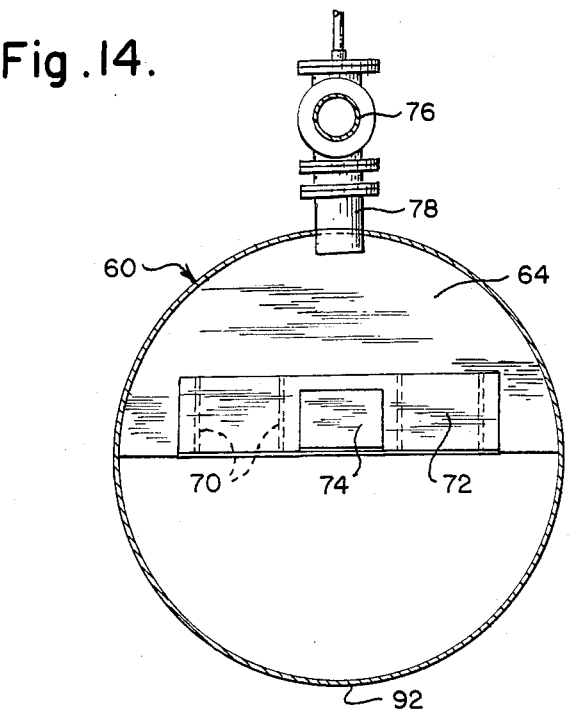
FIG. 14 is a view through the cross-section A—A of FIG. 13.

FIG. 13 presents a side sectional view of a submerged oil-water separator tank 60 having a diffusion baffle assembly 72. Tank 60 can be cylindrical and have flat ends. Assembly 62 comprises a barrier member 64 which depends vertically downwardly from the top of the tank and across the entire upper hemisphere of tank 60 to segregate an inlet zone 66 which comprises a relatively small region of tank 60 to the right of barrier 64 from a relatively large separator region 68 which constitutes the region of tank 60 to the left of barrier 64. A pair of triangular support members 70 comprise equilateral right triangular supports, as indicated in FIGS. 13 and 14, so that velocity head diffusion baffle 72 having wear plate 74 on its face is mounted on the hypotenuse thereof and inclined at an angle of 45 degrees with respect to the horizontal with the baffle surface facing upwardly and towards the inlet end of the tank. As shown in FIG. 14, plate 74 and diffusion baffle 72 are disposed centrally in the lower portion of the upper hemisphere of the tank. As shown in FIGS. 13 and 14, there is an open passageway in the lower hemisphere of the tank between plate 74 and tank bottom 92.

Tank 60 is disposed below ground level 75 and is lowered into a prepared ground excavation by means of lifting lugs 79. Access is provided to tank 60 through a pair of normally closed manways 80 and 80' set individually within a pair of corrugated metal pipes 82 and 82' and provided with a pair of surface manway covers 84 and 84'. A mixture of oil, water and solids is passed by gravity flow, or possibly under pump pressure, to tank 60 from one or more surface locations, not shown, through pipe 76 and vertical inlet nozzle 78. Inlet nozzle 78 is disposed vertically above wear plate 74 mounted on baffle 72 so that incoming liquid impinges upon wear plate 74. The flow of oil-containing material in the system is indicated by dark arrows while the flow of water separated therefrom in the system is indicated by light colored arrows.

The incoming stream 86 impacts upon flat wear plate 74 and is reflected downwardly away from plate 74 towards inflow end 90 of the tank as indicated by arrow 91. An adequate distance 93 is provided to accomodate flow between the bottom of plate 74 and wall 90 at least equal to the diameter of nozzle 86 and the stream thereupon impacts upon end wall 90 and is reflected therefrom, as indicated by arrow 94. Then, the stream is reflected by tank bottom 92 and flows upwardly through separating zone 68 as indicated by arrows 96. Water-oil separation and solids removal occur within zone 68. The stream then passes through a vertical stack of parallel coalescer plates 98 having corrugations running transversely to fluid flow. Corrugated plates 98 can be spaced about three inches apart. The stack of coalescer plates can be located astride the vertical centerline of tank 60.

Figure 15:
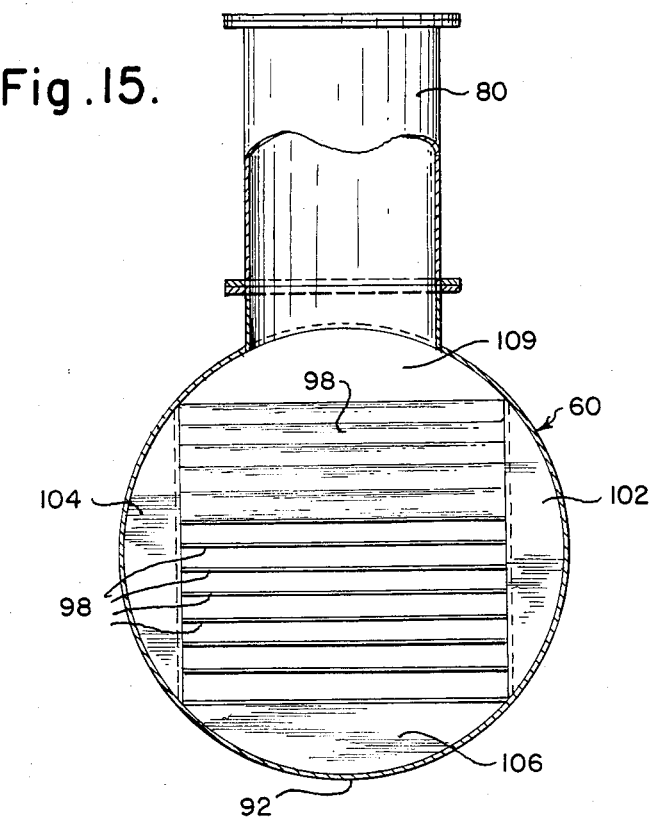
FIG. 15 is a view through the cross-section B—B of FIG. 13.

Fluid flow is prevented from by-passing the pack of corrugated baffles 98 by plates 102 and 104 and sludge baffle 106. See FIGS. 13 and 15. Sludge baffle 106 demarks a vertical distance between the bottom of the pack of corrugated coalescer plates 98 so that any solids removed from the stream flowing between coalescer plates 98 can drop away from the flow path. Coalescer plates 98 are inclined upwardly in the direction of outlet end 107 of the tank so that solids removed in the plates can drain downwardly and away from coalescer plates 98 onto bottom 92 of the tank. An open space which includes all the space above coalescer plates 98 and between plates 102 and 104 remains on the top of the pack of corrugated plates 98 so that oil layer 108 formed downstream from the corrugated plates can equalize itself on both the inlet and outlet sides of the pack.

Coalescer plates 98 are inclined at an angle of about 22.5 degrees. As shown in FIG. 13, this angle is the angle between the plates 98 and the horizontal base of the plate assembly and of the tank. This angle corresponds generally to the stream flow angle of approach as indicated by arrows 96. Since this flow angle of approach is determined by the 45 degree angle of inclination of wear plate 74, there is a clear relationship between the angles of inclination of wear plate 74 and of coalescer plates 98. Coalescer plates 98 divide approaching stream 96 into a plurality of discrete streams flowing between adjacent spaced apart plates 98. Oil droplets in each discrete stream have a relatively small vertical distance to travel before reaching the underside of a coalescer plate. When reaching the underside of a coalescer plate the droplets tend to flow upwardly along the corrugated surface. The undulations induce coalescing of the droplets traveling along the undulating surface, creating oil droplets of increasing size during transit of the stream upwardly across plates 98 from the lower inlet end to the higher discharge end. Finally, at the discharge end, the relatively large oil droplets formed in the coalescer plates 98 are capable of rapidly rising to overhead oil layer 108 as indicated by arrow 110, while a lower purified water layer 112 forms, as indicated by arrows 88. 114 demarks the interface between the two layers.

Interface level sensor 116 is an interface probe and can be a float switch, a thermal conductivity device or an electric resistance device. It passes a signal through conduit means 118 to a control panel 120 on the surface. Panel 120 can include an alarm to indicate when the descending oil-water interface reaches a predetermined point. Oil pump means, not shown, can respond either manually or automatically to a detected change in level 114 by pumping some of oil layer 108 out of tank 60 through oil conduit means 122. The pump can be turned off when the level rises to another predetermined point. Conduits 118 and 122 are disposed within a manway defined by corrugated piping 124 having manway cover 126. Water from which oil has been separated in layer 112 is removed through water removal pipe 128. Oil level 108 can force water outwardly through pipe 128 or pipe 128 can lead to a water pump, not shown.

The system is vented to atmosphere at various positions, as indicated at 130, 132 and 134. Submerged tank 60 is protected against external corrosion by means of an cathodic protection system as indicated at positions 136 and 136'.

In operating oil-water separator tank 60, the tank is maintained essentially full of liquid throughout. Periodically, tank 60 can be pumped empty of both oil and water and an operator can enter through manways 80 and 80' to remove solids formation on tank bottom 92. Upon restarting, the tank should be filled with clear water before initiating flow of oil-water mixture through conduit 76.

I claim:
1. An oil-water separator comprising:
a separator tank;
said tank having an inlet end with an inlet end wall and an outlet end with an outlet end wall;
barrier means depending vertically downwardly from the top of said tank relatively close to said inlet end wall and relatively remote from said outlet end wall;
said barrier means extending across the upper portion of said tank relatively close to said inlet end wall to define a relatively small and relatively turbulent inlet zone between said barrier means and said inlet end wall and a relatively large and relatively quiescent oil-water separator zone in said tank between said barrier means and said outlet end wall;
inlet nozzle means in said inlet zone for supplying an oil-water feed mixture in a generally vertical downwardly direction in said inlet zone;
baffle means having a feed flow impact surface in said inlet zone located below said inlet nozzle means so that the downwardly flowing oil-water feed mixture impacts upon said impacts surface;
said feed flow impact surface being separated from both said inlet nozzle means and said inlet wall and said feed flow impact surface inclined upwardly at an angle of about 35 to 55 degrees with respect to the vertical so that said surface faces towards both said inlet nozzle means and said inlet end wall so that the downwardly flowing oil-water feed mixture from said inlet nozzle means impacts upon and is diffused and deflected by said impact surface so that said mixture flows in an inclined path downwardly to said inlet end wall;
passageway means between said flow impact surface and the bottom of said tank to provide flow access for said diffused feed mixture from said inlet end wall to said separator zone;
a plurality of vertically spaced apart coalescer plates at an intermediate region in said separator zone between said barrier means and said outlet end wal to assist in oil-water separation with said coalescer plates inclined upwardly in the direction towards said outlet end wall at an angle between about 15 and 45 degrees with respect to the horizontal;
by-pass prevention barrier means insalled around said plates to channel flow in said tank through said coalescer plates;
water outlet means near said outlet end wall for removing clarified water from said separtor zone; and
oil outlet means near said outlet end wall for removing separated oil from said separator zone.

2. The oil-water separator of claim 1 wherein said inlet end wall and said outlet end wall are flat.

3. The oil-water separator of claim 1 wherein said baffle means is inclined at an angle of about 40 to 50 degrees with respect to the vertical.

4. The oil-water separator of claim 1 wherein said baffle means is inclined at an angle of about 45 degrees with respect to the vertical.

5. The oil-water separator of claim 1 wherein said spaced apart coalescer plates are inclined at an angle of about 22.5 degrees with respect to the horizontal.

6. The oil-water separator of claim 1 wherein said tank is a cylindrical tank and said barrier means extends across the entire upper hemisphere thereof.

7. The oil-water separator of claim 6 including shelf-means mounted on the inlet end face of said barrier means, said shelf means shaped as an equilateral right triangle, and said baffle means mounted on the hypotenuse of said shelf means.

8. The oil-water separator of claim 1 including wear plate means mounted on the surface of said baffle means.

9. The oil-water separator of claim 8 wherein said wear plate means has a flat surface.

10. The oil-water separator of claim 1 disposed in a subterranean location.

11. The oil-water separator of claim 1 including an oil-water interface level sensor.

12. The oil-water separator of claim 1 including at least two manhole means at the top of said tank.

13. The oil-water separator of claim 1 wherein said plurality of spaced apart coalescer plates have corrugations extending transversely to the direction of flow.

14. The oil-water separator of claim 13 wherein said plurality of spaced apart coalescer plates are disposed above the bottom of said tank to provide a space below said plates for the gravity flow of sludge.

15. The oil-water separator of claim 1 wherein said water outlet conduit means extends to a relatively low region of said tank and said oil outlet conduit means extends to a relatively higher region in said tank.

16. The oil-water separator of claim 1 wherein said tank is a rectangular tank.

17. A method for separting oil and water in an oil-water admixture in a separator tank having an inlet end and an inlet end wall and an outlet end and an outlet end wall with a baffle having a feed flow impact surface near said inlet end wall inclined at an angle between about 35 to 55 degrees with respect to the vertical so that said impact surface faces upwardly and towards said inlet end wall, said method comprising passing a feed stream containing said admixture vertically downwardly onto said impact surface so that said impact surface diffuses said stream laterally and deflects said stream with relative turbulence in a downwardly inclined path to said inlet end wall, said stream then flowing from said inlet end wall towards said outlet end wall with relative quiescence passing through coalescer plates having by-pass prevention barrier means with asid plates inclined at an angle between 15 and 45 degrees with respect to the horizontal while oil and water separate from each other, and removing separate water and oil streams from locations near said outlet end wall.

18. The method of claim 17 wherein said angle is 40 to 50 degrees with respect to the vertical.

19. The method of claim 17 wherein said angle is 45 degrees with respect to the vertical.

20. The method of claim 17 wherein said admixture contains solids.

21. The method of claim 17 wherein the horizontal velocity of liquid through said tank is no greater than 3 feed per minute.

22. The method of claim 17 wherein the diffusing stream flowing from said outlet end wall of said tank towards said outlet end wall passes through a plural.ity of coalescer plates inclined upwardly towards said outlet end wall.

23. The method of claim 22 wherein said coalescer plates are corrugated in a direction transverse to flow.

24. The method of claim 22 wherein said coalescer plates are inclined at an angle of about 22.5 degrees with respect to the horizontal.

* * * * *

UNITED STATES PATENT AND TRADEMARK OFFICE
CERTIFICATE OF CORRECTION

PATENT NO. : 4,722,800
DATED : February 2, 1988
INVENTOR(S) : Gregory G. Aymong

It is certified that error appears in the above-identified patent and that said Letters Patent is hereby corrected as shown below:

Column 2, line 32, change "cross" to --across--.

Column 3, line 43, change "all" to --wall--.

Column 4, line 67, after "flow" insert --by--.

Column 5, line 2, change "as" to --was--.

Column 5, line 36, change "to" to --no--.

Column 9, line 48, claim 1, change "impacts" to --impact--.

Column 9, line 66, claim 1, change "wal" to --wall--.

Column 10, line 3, claim 1, change "insalled" to --installed--

UNITED STATES PATENT AND TRADEMARK OFFICE
CERTIFICATE OF CORRECTION

PATENT NO. : 4,722,800

DATED : February 2, 1988

INVENTOR(S) : Gregory G. Aymong

Page 2 of 2

It is certified that error appears in the above-identified patent and that said Letters Patent is hereby corrected as shown below:

Column 11, line 2, claim 17, change "asid" to --said--.

Column 12, line 3, claim 21, change "feed" to --feet--.

Column 12, line 5, claim 22, change "outlet" to --inlet--.

Column 12, line 6, claim 22, change "plural.ity" to --plurality--

Signed and Sealed this

Nineteenth Day of July, 1988

Attest:

DONALD J. QUIGG

Attesting Officer

Commissioner of Patents and Trademarks